US006698133B1

(12) United States Patent
Fricke

(10) Patent No.: US 6,698,133 B1
(45) Date of Patent: Mar. 2, 2004

(54) ADJUSTABLE PIN RIG AND METHOD FOR RIGGING A BAIT

(76) Inventor: Charles Fricke, P.O. Box 420206, Summerland Key, FL (US) 33042

( * ) Notice: Subject to any disclaimer, the term of this patent is extended or adjusted under 35 U.S.C. 154(b) by 0 days.

(21) Appl. No.: 10/269,266

(22) Filed: Oct. 11, 2002

(51) Int. Cl.[7] ............................................. A01K 83/06
(52) U.S. Cl. ...................................................... 43/44.2
(58) Field of Search ................................. 43/44.2, 44.4, 43/44.6, 44.8, 44.89

(56) References Cited

U.S. PATENT DOCUMENTS

| | | | | |
|---|---|---|---|---|
| 70,913 A | | 11/1867 | Sterling | |
| 881,805 A | | 3/1908 | Klein | |
| 1,791,723 A | * | 2/1931 | Hampton | 43/44.8 |
| 1,863,544 A | * | 6/1932 | Prouse | 43/44.8 |
| 2,241,301 A | * | 5/1941 | Gall | 43/42 |
| 2,518,593 A | * | 8/1950 | Bell | 43/44.2 |
| 2,605,580 A | * | 8/1952 | Moore | 43/44.8 |
| 2,622,363 A | | 12/1952 | Bodwell | |
| 2,710,481 A | * | 6/1955 | Matthes | 43/44.8 |
| 2,745,208 A | * | 5/1956 | Zech | 43/44.8 |
| 2,763,086 A | | 9/1956 | Johnson et al. | |
| 2,791,861 A | * | 5/1957 | Beck | 43/44.6 |
| 2,854,781 A | | 10/1958 | Scozzari | |
| 2,860,443 A | | 11/1958 | Robinson | |
| 2,871,611 A | * | 2/1959 | Shepard, Jr. | 43/44.2 |
| 2,880,545 A | | 4/1959 | Stadler | |
| 2,895,254 A | * | 7/1959 | Kraus | 43/44.6 |
| 2,900,754 A | | 8/1959 | Orlik | |
| 2,977,710 A | | 4/1961 | Stambaugh | |
| 3,047,977 A | * | 8/1962 | Der-Hagopian | 43/44.8 |
| 3,327,423 A | | 6/1967 | Kotis | |
| 3,435,553 A | * | 4/1969 | Conley | 43/44.8 |
| 3,608,230 A | * | 9/1971 | Hribar | 43/44.89 |
| 3,645,031 A | | 2/1972 | Egles | |
| 3,736,691 A | | 6/1973 | Gist | |
| 3,738,048 A | | 6/1973 | Duchscher | |
| 3,750,323 A | * | 8/1973 | Weis | 43/42.28 |
| 4,133,132 A | | 1/1979 | Ellis et al. | |
| 4,279,092 A | * | 7/1981 | Hutson | 43/44.91 |
| 4,688,347 A | | 8/1987 | Krogmann | |
| 4,791,751 A | * | 12/1988 | Francklyn | 43/44.6 |
| 4,932,154 A | * | 6/1990 | Andreetti | 43/44.6 |
| 4,964,234 A | | 10/1990 | Davey | |
| 5,177,895 A | | 1/1993 | Baron | |
| 5,218,780 A | | 6/1993 | Jacobson | |
| 5,386,661 A | * | 2/1995 | Davis | 43/44.8 |
| 5,881,490 A | | 3/1999 | Richardson | |
| 6,230,433 B1 | * | 5/2001 | Nichols | 43/42.53 |
| 6,516,552 B2 | * | 2/2003 | Hawkins | 43/42.09 |

* cited by examiner

Primary Examiner—Charles T. Jordan
Assistant Examiner—Jordan M Lofdahl
(74) Attorney, Agent, or Firm—Malloy & Malloy, P.A.

(57) ABSTRACT

An adjustable pin rig and a method for rigging a bait wherein the pin rig includes at least one pin interconnected to a pin support. The pin has a free end which is structured to pierce through at least a portion of the bait. A fastener is included which is structured to engage the free end of the pin to at least partially secure the pin rig to the bait. The pin support includes an attachment mechanism structured to secure the pin rig to at least a portion of a leader to which one or more hooks are attached. A multi-purpose rigging tool is provided to facilitate securing of the fastener and attachment mechanism. The method includes inserting a hook attached to a leader into the bait, attaching a pin support to a portion of the leader, piercing a portion of the bait with a free end of a pin, and securing a fastener to the free end of the pin. The method may also include removing a portion of the pin extending outwardly from the bait.

16 Claims, 3 Drawing Sheets

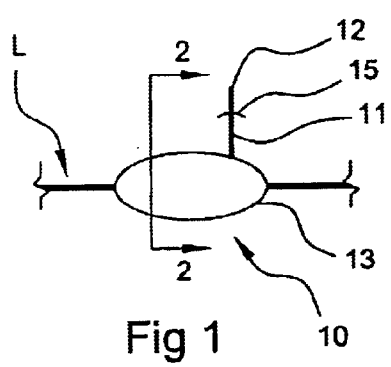
Fig 1
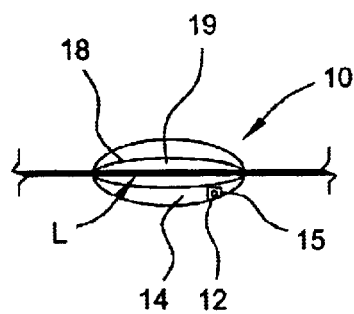
Fig 3
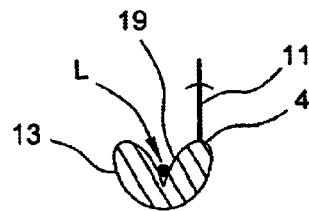
Fig 2
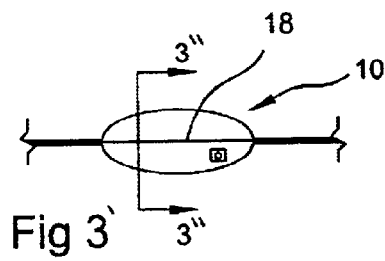
Fig 3'
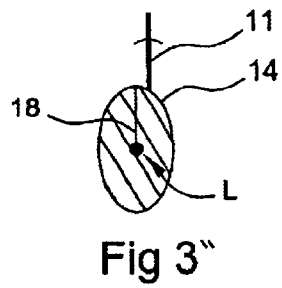
Fig 3"
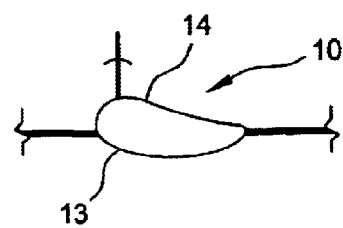
Fig 4
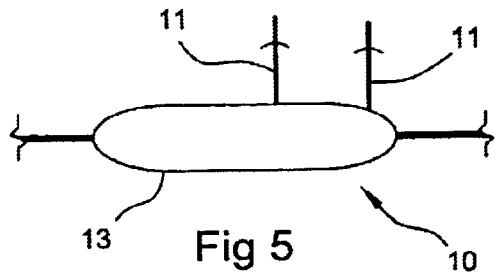
Fig 5

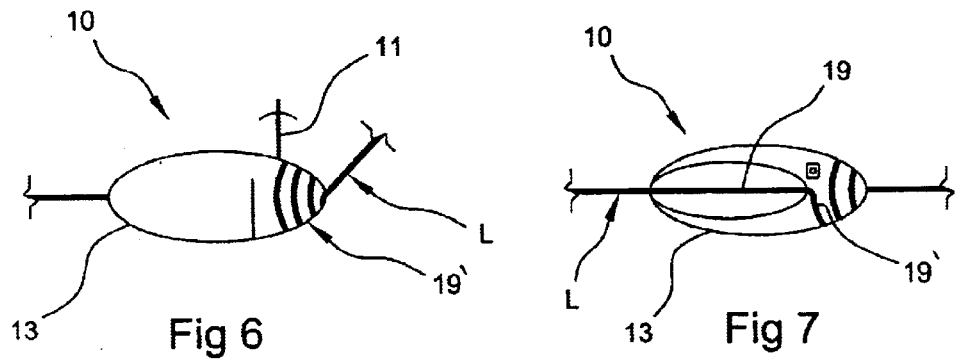
Fig 6  Fig 7
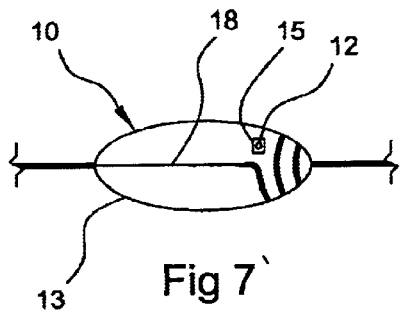
Fig 7`
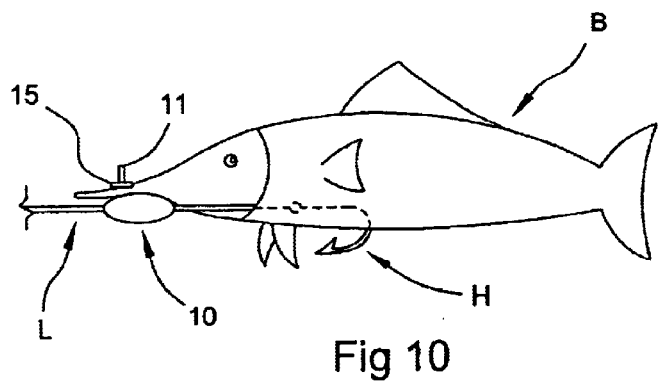
Fig 10
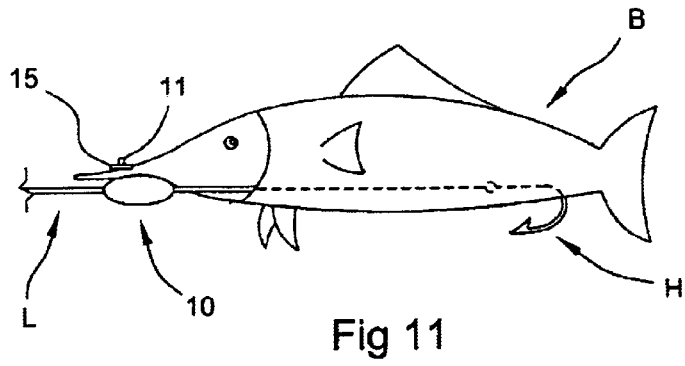
Fig 11

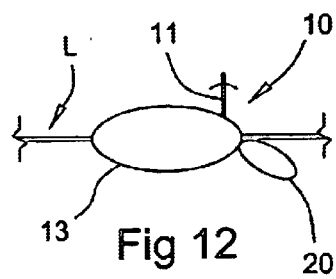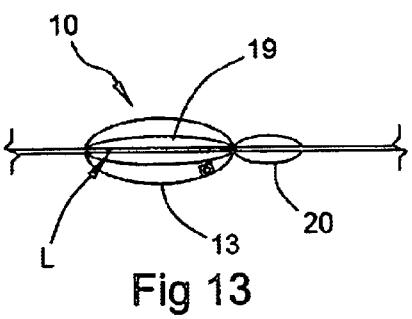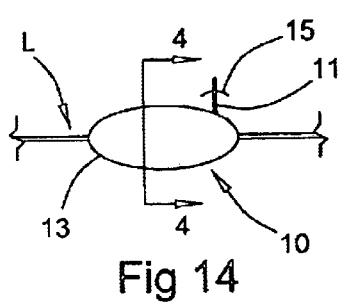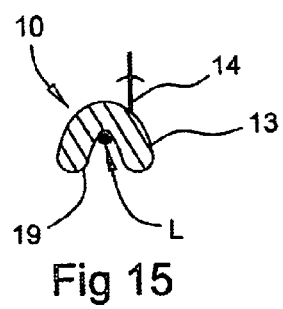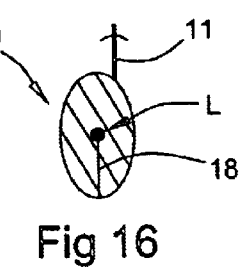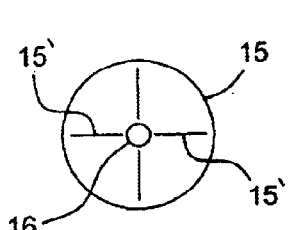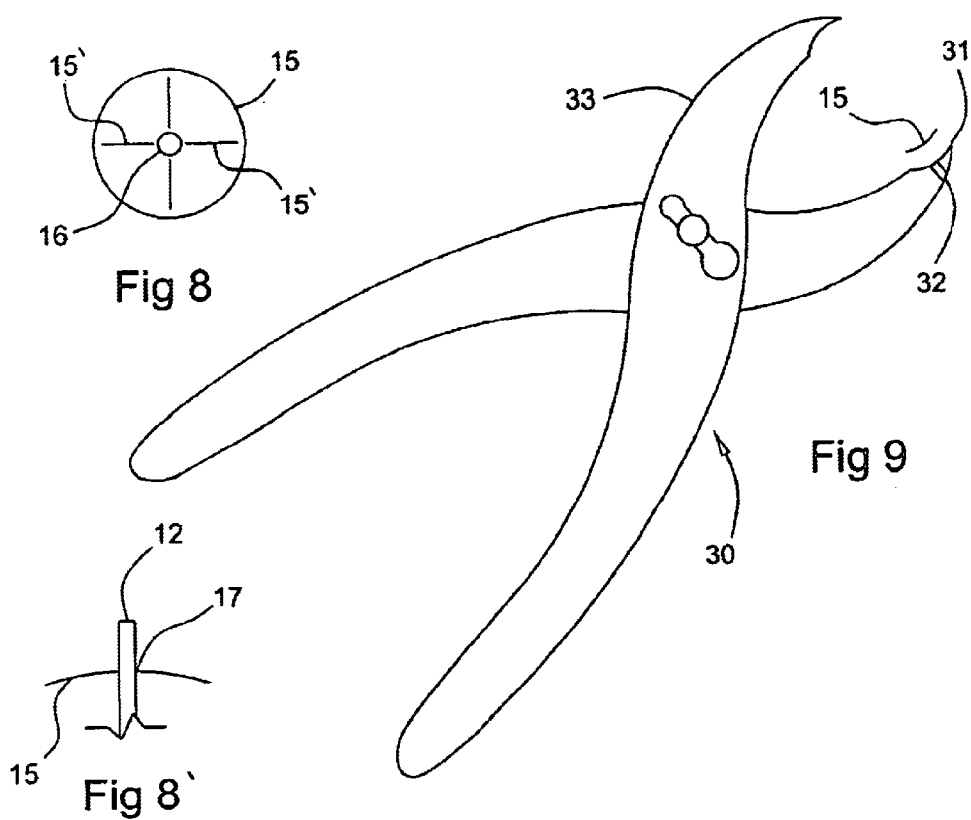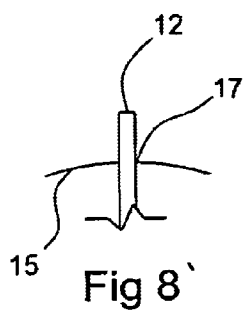

ADJUSTABLE PIN RIG AND METHOD FOR RIGGING A BAIT

BACKGROUND OF THE INVENTION

1. Field of the Invention

The present invention relates to an adjustable pin rig and method for rigging a bait. More specifically, the present invention is directed to an adjustable pin rig and a method for rigging a bait which imparts a natural "swimming" motion to the bait while it is being trolled, which allows a fisherman to rig and/or re-rig the bait with one or more hooks without completely disassembling a setup and/or tearing into the bait and rendering it unusable, which is natural in appearance and unobtrusive to the fish desired to be caught, and further, which is inexpensive to manufacture.

2. Description of the Related Art

As the sport of fishing continues to grow at an increasingly rapid pace, and, in particular, the professional tournament fishing circuit, the demand for an entire gamut of fishing tackle and accessories has also grown considerably. It has long been the preference of fishermen to utilize live bait attached to a rod and reel, or other retrieval device, to attract a target species of fish they desire to catch. It is also the preference of fishermen to utilize bait which is native to the area and/or is known to attract the target species of fish. It is also well known that the availability of live bait is often limited, and even when supplies are available, the task of keeping the bait alive long enough to be utilized for fishing may be difficult, if not impossible. As such, fisherman often utilize dead bait which are commonly frozen to facilitate storage and subsequent handling. Another alternative is the use of synthetic baits which may be configured to mimic the appearance of a naturally occurring bait fish, although it is generally recognized that these types of baits are less preferable.

Given the highly competitive and often lucrative field of tournament sport fishing, a number of devices have been developed to attach or rig a hook to a bait, including live, dead, and synthetic baits, and subsequently, to the rest of the fishing equipment. There are a number of factors which must be considered, particularly when rigging a dead bait, to maximize the possibility of attracting and catching a target species of fish. A primary concern with dead bait is to rig the bait in such a manner that the bait simulates a natural "swimming" motion as it is trolled behind a vessel, a common practice in sport fishing, which is very important in attracting fish. In addition, fishing conditions may require that a bait be re-rigged, such as moving the hook from the front to the rear of the bait, based on the strike habits of the target species of fish at any given time. For example, some types of fish, such as a "kingfish" typically slash or attack a bait from the rear, whereas others, such as some "billfish" typically attack the head of the bait. Other popular target species of fish, such as dolphin, may attack the bait from either approach and, therefore, the ability to re-rig the bait to accommodate the various strike habits of a target species of fish is highly desirable.

A further concern when rigging dead bait is to attach the bait in a manner that does not detract from the natural appearance of the bait, such that the rig is unobtrusive when it is presented to the target species of fish. Additionally, the ability to quickly and easily rig or re-rig a bait is important, particularly in the tournament fishing circuit, where lost time may equate to a lost catch and/or tournament, with the subsequent loss of valuable prize money.

It is common practice in rigging dead bait to use some type of a pin rig which helps the bait simulate a natural "swimming" motion. Such pin rigs are generally attached to one end of a leader at the point where one or more hooks are attached, and are particularly effective in aiding the simulation of a natural "swimming" motion when secured to the bait through the mouth or snout. Specifically, when a pin rig is properly secured through the mouth of the bait, it serves to keep the mouth closed while trolling, thus preventing water from being forced into the bait which distorts the "natural" swimming motion, as well as limiting the degradation of the bait due to the force of the water flowing through. It is a generally accepted practice to utilize a length of wire tightly wrapped around the snout of the bait and the leader to which the pin rig is attached, along both sides of the section of the pin which extends upward through the snout of the bait in order to secure the pin rig to the bait. While this is effective to secure the pin rig to the bait, it is extremely time consuming. As such, many fishermen, particularly when fishing in a tournament, may pre-rig a number of baits in this manner, thereby having a bait/leader/pin rig combination ready to be attached to the remainder of their fishing equipment. However, as should be appreciated, this method does not allow for quick and easy re-rigging, as is often required in the heat of a tournament.

As such, a number of devices have been developed to minimize the time required to secure a pin rig to a bait. Specifically, a number of hood type devices have been developed which reduce the time required to perform this operation. These devices are structured to enclose a portion of the leader while engaging the section of the pin which extends upward through the snout of the bait. A major drawback to these devices is that they do not facilitate positioning a hook near the rear of the bait, as the pin rigs are typically attached to the end of the leader where the hook is attached. A further disadvantage of these hood devices is that they detract significantly from the natural appearance of the bait which is to be presented to the target species of fish, thereby reducing the likelihood of a strike and subsequent catch.

A further disadvantage with the aforementioned means for securing the pin rig to the bait, is that they rely on the extension of a significant portion of the pin upward through the snout of the bait. Although the pin rigs discussed are effective in aiding the "natural" swimming motion of the bait to increase the potential for a strike, once a strike occurs, the target species often disgorges the bait upon biting down and contacting the upwardly extending pin. Thus, an ideal pin rig will not only attract the target species to strike, but it will remain unobtrusive to the target species long enough for the fisherman to set the hook within the mouth of the target fish.

One attempt to overcome the aforementioned problems, is a hood like device which eliminates the pin completely. This device comprises a multi-sectioned plastic hood which is secured over the head of a bait. The device comprises a first section having a post which is inserted through one side of the bait, such as though the eyes, and a second section having a seat designed to securely receive the post, thus securing the device to the bait. The device further comprises a section of beaded chain between the leader and the hook, which allows the hook to be positioned near either the front or rear of the bait. The first and second sections are further structured to secure a portion of the beaded chain near the front of the bait, when the sections are secured together. This provides an additional advantage of directing the trolling force to the point where the bead is secured to the hood, thus minimizing the force exerted on the bait by the hook, which further improves the "natural" swimming motion of the bait, as well as reduces the wear and tear on the bait. Unfortunately, the advantages thus provided are countered by directing the trolling forces to the point where the bead chain is secured to the hood. Specifically, the beaded chain utilized by this device is the weakest link between the leader and the hook, and the potential for losing a target fish, even once the hook has been set, is significantly increased.

Another device which eliminates the use of a pin comprises a leader having a swivel at one end and a loop structured to accept a first hook at the other end. A second hook is attached to the leader and is positionable along the leader between the swivel and the first hook. In addition, this device includes a length of thin wire attached to the leader and positionable between the second hook and the swivel which is utilized to hold the mouth of the bait closed as well as to maintain the leader, and thus the hooks, in the desired position relative to the bait. While this device permits a bait to be rigged with the hook or hooks in varied locations to accommodate various strike habits of the target species of fish, it is time consuming to wrap the thin wire around the mouth of the bait to secure the device in position for use. Further, the wire wrapping detracts from the natural appearance of the bait, which may reduce the number of fish attracted to the bait.

Thus, it would be beneficial to provide a pin rig and a method for rigging a bait which allows one or more hooks to be adjustably positioned between the front and rear of a bait. Additionally, it would be helpful for any such adjustable pin rig developed to be quickly and easily attached and detached from a bait, to allow quick and easy rigging and re-rigging of the bait. Further, any such adjustable pin rig and method for rigging a bait would preferably aid in imparting a natural "swimming" motion to the bait. In addition, if any such adjustable pin rig and method of rigging a bait were developed, it would be best if it were unobtrusive to the target species of fish desired to be caught. Also, it would be preferable for any such adjustable pin rig to be inexpensive to manufacture so that it would be readily available to all fisherman.

SUMMARY OF THE INVENTION

The present invention is directed to an adjustable pin rig and a method of rigging a bait and addresses these and other needs which remain in the art. The adjustable pin rig includes at least one pin in a preferred embodiment, although in another embodiment the invention comprises a plurality of pins. A pin support is provided to which at least a portion of each pin is interconnected. Each pin further comprises a free end which is structured to extend outwardly from the pin support, and is further structured to pierce a portion of the bait. In one embodiment, the free end of each pin is structured to extend upwardly from an upper surface of the pin support so as to allow each pin to pierce the bait from the underside through the top.

The adjustable pin rig of the present invention further includes at least one fastener for each pin, wherein each fastener is structured to engage a different one of each of the plurality of pins. More specifically, each fastener is structured to at least partially secure the adjustable pin rig to the bait. The pin support is structured to be adjustably positionable along at least a portion of a leader to which one or more hooks are attached. Further, the pin support includes an attachment mechanism which is structured to secure the adjustable pin rig to at least a portion of the leader, which is preferably disposed adjacent the front and along the underside of the bait.

The present invention further comprises a method for adjustably rigging a bait. The method includes inserting a hook which is attached to a length of leader into the bait, positioning a portion of the leader along the underside and adjacent the front of the bait, connecting at least one pin which has a free end to a pin support, piercing the bait from the underside through the top and adjacent the front of the bait with the free end of the pin, securing a fastener to the free end of the pin, and attaching the pin support to a portion of the leader adjacent the front and along the underside of the bait. The method may further comprise removing a portion of the pin extending outwardly from the bait.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a side elevation of one preferred embodiment of an adjustable bait rig of the present invention.

FIG. 2 is a cross section of the embodiment of the bait rig of FIG. 1 along line 2—2 thereof.

FIG. 3 is a plan view of the embodiment of the adjustable bait rig of FIG. 1 illustrating an attachment channel in an open orientation.

FIG. 3' is a plan view of the embodiment of the adjustable bait rig of FIG. 1 illustrating an attachment channel in a closed orientation.

FIG. 3" is a cross section of the embodiment of the bait rig of FIG. 3' along line 3"—3" thereof.

FIG. 4 is a side elevation of an alternate embodiment of the adjustable bait rig of the present invention illustrating a tapered pin support.

FIG. 5 is a side elevation of an alternate embodiment of the adjustable bait rig of the present invention illustrating a plurality of pins.

FIG. 6 is a side elevation of an alternate embodiment of the adjustable bait rig the present invention including an attachment channel having a spiral portion.

FIG. 7 is a plan view of the embodiment of the adjustable bait rig of FIG. 6 illustrating the attachment channel in an open orientation.

FIG. 7' is a plan view of the embodiment of the adjustable bait rig of FIG. 6 illustrating the attachment channel in a closed orientation.

FIG. 8 is a plan view of one embodiment of a fastener of the present invention.

FIG. 8' is a partial cutaway side elevation of the fastener of FIG. 8 securely engaging a free end of a pin.

FIG. 9 is a perspective view of one embodiment of a multi-purpose rigging tool.

FIG. 10 is a side elevation of one embodiment of the adjustable bait rig of the present invention attached to a bait, and illustrating a hook placement near the front of the bait.

FIG. 11 is a side elevation of the embodiment of the adjustable bait rig of FIG. 10 attached to a bait, and illustrating a hook placement near the rear of the bait and a trimmed pin.

FIG. 12 is a side elevation of an embodiment of the adjustable bait rig of the present invention further comprising a deflector attached in a downward orientation.

FIG. 13 is a plan view of the adjustable bait rig of FIG. 12.

FIG. 14 is a side elevation of another alternate embodiment of an adjustable bait rig of the present invention.

FIG. 15 is a cross section of the embodiment of the bait rig of FIG. 14 along line 4—4 thereof illustrating an attachment channel in an open orientation.

FIG. 16 is a cross section of the embodiment of the bait rig of FIG. 14 along line 4—4 thereof illustrating an attachment channel in a closed orientation.

Like reference numerals refer to like parts throughout the several views of the drawings.

DETAILED DESCRIPTION OF THE PREFERRED EMBODIMENT

While this invention is susceptible of embodiment in many different forms, there is shown in the drawings and will herein be described in detail at least one specific embodiment, with the understanding that the present disclosure is to be considered as an exemplification of the principles of the invention and is not intended to limit the invention to the embodiment illustrated.

The present invention is directed to an adjustable bait rig generally shown as 10 throughout the figures. The adjustable bait rig 10 comprises at least one pin 11 having a free end 12. The pin 11 is preferably constructed of a rigid material such as, by way of example only, metal or a non-deformable plastic material. The pin 11 is further structured such that at least a portion of the pin 11 is removable once the adjustable bait rig 10 is secured to the bait such that the pin 11 is unobtrusive to the fish desired to be caught. In at least one embodiment of the present invention, the adjustable bait rig 10 comprises a plurality of pins 11, as illustrated in FIG. 5.

Further, the adjustable bait rig 10 comprises a pin support 13, to which at least a portion of each pin 11 is interconnected. The pin support 13 may comprise any one of a number of materials of construction including metals, alloys, or other weighted materials, however, it is also envisioned that the pin support 13 of the present invention may comprise one or more synthetic materials such as plastics which may impart buoyant properties to the adjustable pin rig 10. In one preferred embodiment, the pin support 13 comprises lead, however, it is within the scope of the present invention to utilize other malleable materials, including synthetics. The pin support 13 comprises an upper surface 14 which is structured to be disposed adjacent the bait, preferably along the underside and adjacent the front of the bait. In at least one embodiment, the upper surface 14 comprises a taper, as illustrated in FIG. 4, which is specifically molded to conform to the shape of the underside of a particular type of bait to facilitate positioning the pin support 13 adjacent the bait. In at least one embodiment, the pin support 13 may comprise a specific color, such as by painting, tinting, dying, or other known methods to correspond with the color of the bait intended to be utilized. This provides the adjustable bait rig 10 with an unobtrusive appearance when disposed in an operative position adjacent the bait.

The pin 11 may be interconnected to the pin support 13 by any well known means including but not limited to welding, soldering, adhesives, or by mechanical fasteners such as nails or screws. In one preferred embodiment, the portion of the pin 11 which is interconnected to the pin support 13 is positioned in a mold into which molten lead is added and allowed to cool and harden, thereby securing the pin 11 to the pin support 13. As shown in the figures, the free end 12 is generally disposed opposite the portion of the pin 11 interconnected to the pin support 13. In a preferred embodiment, the free end 12 of the pin 11 extends outwardly from the upper surface 14 of the pin support 13, as illustrated in the figures.

The adjustable pin rig 10 further comprises at least one fastener 15. The fastener 15 is structured to attach to the free end 12 of the pin 11 after it has pierced through a portion of the bait, thereby at least partially securing the adjustable pin rig 10 to the bait. In at least one embodiment, the fastener 15 comprises a round and slightly convex configuration having an aperture 16 disposed near its center, commonly known as a "speed nut." The aperture 16 is structured such that at least a portion of a periphery 17 of the aperture 16 securely engages a portion of the free end 12 of the pin 11, as illustrated in FIG. 8'. A multi-purpose rigging tool 30 may be provided to facilitate securing the fastener 15 to the free end 12 of the pin 11. In at least one embodiment, the multi-purpose rigging tool 30 has a magnetic tip 31 structured to retain a fastener 15 made of a ferrous material in position on the tool 30 to facilitate engagement of the fastener 15 with the free end 12 of the pin 11. The multi-purpose rigging tool 30 also preferably includes a rigging aperture 32 disposed in the tip 31 to accommodate the free end 12 of the pin 11 as the fastener 15 is forced over the free end 12 of the pin 11 and secured thereto.

In at least one embodiment, the fastener 15 comprises one or more scores 15' along its surface to facilitate removal of the fastener 15 from the pin 11. This is accomplished by squeezing the fastener 15 along the score or scores 15' with the multi-purpose tool 30 and breaking the fastener 15 off of the free end 12 of the,pin 11. In the embodiment of the adjustable pin rig 10 of the present invention comprising a plurality of pins 11, such as illustrated in FIG. 5, the adjustable pin rig 10 further comprises a plurality of fasteners 15, wherein each of the plurality of fasteners 15 is structured to engage a different one of each of the plurality of pins 11.

The pin support 13 further comprises an attachment mechanism 18 structured to attach the adjustable pin rig 10 to at least a portion of a leader (L), wherein the leader has one or more hooks attached thereto. The leader may comprise any one of a number of materials including, but not limited to, monofilament, single wire, stranded wire, nylon, Dacron, or the new space-age high strength monofilament lines. In one preferred embodiment, the attachment mechanism 18 comprises an attachment channel 19 having an open orientation, as illustrated in FIGS. 2, 3, and 7, and a closed orientation, as illustrated in FIGS. 3', 3", and 7'. The open orientation is at least partially defined by the attachment channel 19 being positionable into a partially surrounding relation to at least a portion of the leader. An advantage of the attachment channel 19 of the present invention is that it permits the adjustable pin rig 10 to be attached to any of the various types of leader materials which may have widely varying diameters. Further, the open orientation of the attachment channel 19 allows the pin support 13 to be movably positionable along at least a portion of the leader.

In one preferred embodiment, the pin support 13 is positioned around the portion of the leader along the underside and adjacent the front of the bait in such a manner as to minimize the slack in the leader between the pin 11 and the hook, which aids in the natural "swimming" motion of the bait. Once the pin support 13 is placed into position around the leader, the attachment channel 19 is quickly and easily disposed into the closed orientation by application of a small amount of pressure along each side of the pin support 13, thereby securely engaging the adjustable pin rig 10 to the desired portion of the leader. The multi-purpose rigging tool 30 includes jaws 33 to facilitate securing the adjustable pin rig 10 to the leader. Further, the malleable properties of the pin support 13 permit the attachment channel 19 to be quickly and easily disposed between the open and closed orientations to allow quick and easy attachment and removal of the adjustable pin rig 10. The tip 31 of the multi-purpose rigging tool 30 may be further utilized to pry the attachment channel 19 into an open orientation to facilitate removal of the adjustable pin rig 10 from the leader. In at least one embodiment, the multi-purpose rigging tool 30 of the present invention is utilized to facilitate quick and easy rigging and re-rigging of the bait as necessary, without requiring the complete disassembly of the setup or rendering the bait unusable.

In the alternate embodiment of the adjustable pin rig 10 illustrated in FIGS. 6, 7, and 7', the attachment channel 19 includes a spiral portion 19' which comprises a groove along the exterior of the pin support 13 near the front into which the leader is disposed. As best illustrated in FIG. 6, the spiral portion 19' of the attachment channel 19 allows the portion of the leader which is to be connected to the fishing rod and reel to form an upwardly directed angle with the pin support 13 to facilitate "split bill" rigging, which is particularly effective with baits such as ballyhoo. The effect of the upwardly directed angle between the leader and the pin support 13 is to impart a diving motion to the bait as it is trolled, such that the bait is maintained at a desired distance below the surface of the water.

Another alternate embodiment of the adjustable pin rig 10 of the present invention is illustrated in FIGS. 12 and 13. In this embodiment, the adjustable pin rig 10 further comprises a deflector, generally shown as 20, attached to the front of the pin support 13 near the pin 11. The downward orientation of the deflector 20 relative to the pin support 13, as illustrated in FIG. 12, also imparts a diving motion to the bait as it is trolled. It is further envisioned that the deflector 20 may be attached to the front of the pin support 13 in an upward orientation relative to the pin support 13. The upward orientation of the deflector 20 imparts a lifting motion to the bait as it is trolled such that the bait remains near the surface.

The present invention further comprises a method for adjustably rigging a bait. The method comprises inserting at least one hook (H) which is attached to a length of leader (L) into a predetermined portion of the bait (B). As previously indicated, depending on the strike habits of the target species of fish, the predetermined portion may be either in the front of the bait, as illustrated in FIG. 10, or in the rear of the bait, as illustrated in FIG. 11. A portion of the leader is positioned along the bait, and in a preferred embodiment, the leader is positioned along the underside and adjacent the front of the bait, as illustrated in FIGS. 10 and 11.

At least one pin having a free end is connected to a pin support, however, in at least one embodiment, a plurality of pins are connected to the pin support. The method further includes piercing the bait with the free end of the pin, and in a preferred embodiment, the bait is pierced from the underside through the top and adjacent the front of the bait. The method further comprises securing a fastener to the free end of the pin, which at least partially secures the adjustable pin rig to the bait. The method of the present invention may further include securing the fastener to the free end of the pin utilizing a multi-purpose rigging tool. In at least one embodiment, the method further comprises removing a portion of the pin which extends outwardly from the bait. This results in a rigged bait which is unobtrusive to the target species of fish, and is less likely to cause the fish to disgorge the bait after a strike due of contact with the pin.

The method further comprises attaching the pin support to a portion of the leader, and in a preferred embodiment, it is attached adjacent the front and along the underside of the bait utilizing the multi-purpose rigging tool. Attaching the pin support in the manner serves to direct the trolling force to the front of the bait, and more specifically, to the pin, which substantially aids in the imparting a natural "swimming" motion to the bait.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. An adjustable pin rig for a bait, comprising:
a pin having a free end, said free end structured to pierce through a portion of the bait,
a pin support, wherein at least a portion of said pin is interconnected to said pin support,
a fastener disposed to engage said pin,
said fastener structured to at least partially secure said adjustable pin rig to the bait,
said pin support comprising an attachment mechanism,
said attachment mechanism structured to attach said pin support to at least a portion of a leader, and
said attachment mechanism comprises an attachment channel having an open orientation and a closed orientation.

2. An adjustable pin rig as recited in claim 1 wherein said pin support comprises a malleable material to facilitate orienting said attachment channel between said open orientation and said closed orientation.

3. An adjustable pin rig as recited in claim 2 wherein said open orientation is at least partially defined by said attachment channel being positionable in a partially surrounding relation to at least a portion of the leader.

4. An adjustable pin rig as recited in claim 3 wherein said closed orientation is at least partially defined by said attachment channel securely engaging at least a portion of the leader.

5. An adjustable pin rig as recited in claim 1 wherein said pin support comprises a weighted material.

6. An adjustable pin rig as recited in claim 1 wherein said attachment channel comprises a substantially linear configuration.

7. An adjustable pin rig as recited in claim 2 wherein said malleable material comprises lead.

8. An adjustable pin rig as recited in claim 2 wherein said malleable material comprises a synthetic material.

9. An adjustable pin rig for a bait, comprising:
at least one pin, said pin having a free end,
a pin support having an upper surface,
at least a portion of said pin interconnected to said pin support,
said free end of said pin extending upwardly from said upper surface of said pin support,
said free end of said pin structured to pierce a portion of the bait from an underside through a top side thereof,
at least one fastener structured to engage said pin,
said fastener further structured to at least partially secure said adjustable pin rig to the bait, said pin support being adjustably positionable along at least a portion of a leader, wherein said pin support is further disposed to securely engage the portion of the leader, and said pin support is structured to securely engage the portion of the leader adjacent to the front and along the underside of the bait.

10. An adjustable pin rig for a bait, comprising:

at least one pin, said pin having a free end, a pin support having an upper surface, at least a portion of said pin interconnected to said pin support, said free end of said pin extending upwardly from said upper surface of said pin support, said free end of said pin structured to pierce a portion of the bait from an underside through a top side thereof, at least one fastener structured to engage said pin, said fastener further structured to at least partially secure said adjustable pin rig to the bait, said pin support being adjustably positionable along at least a portion of a leader, and said fastener comprises an aperture, said aperture being disposable between an engaging orientation and a locking orientation.

11. An adjustable pin rig as recited in claim 10 wherein said fastener comprises a resilient material to facilitate disposing said aperture between said engaging orientation and said locking orientation.

12. An adjustable pin rig as recited in claim 11 wherein said pin is structured to be positionable through said aperture while said aperture is disposed in said engaging orientation.

13. An adjustable pin rig as recited in claim 12 wherein said locking orientation is at least partially defined by a portion of a periphery of said aperture securely engaging a portion of said pin.

14. A method for adjustably rigging a bait, comprising:

inserting at least one hook having a length of leader attached thereto into a predetermined portion of the bait, positioning a portion of the leader along the underside and adjacent the front of the bait, connecting at least one pin having a free end to a pin support, piercing the bait with the free end of the pin from the underside through the top and adjacent the front of the bait, securing a fastener to the free end of the pin, and attaching the pin support to a portion of the leader adjacent the front and along the underside of the bait utilizing a multi-purpose rigging tool.

15. The method of claim 14 further comprising removing a portion of the pin extending outwardly from the bait.

16. A method for adjustably rigging a bait, comprising:

inserting at least one hook having a length of leader attached thereto into a predetermined portion of the bait, positioning a portion of the leader along the underside and adjacent the front of the bait, connecting at least one pin having a free end to a pin support, piercing the bait with the free end of the pin from the underside through the top and adjacent the front of the bait, securing a fastener to the free end of the pin utilizing a multi-purpose rigging tool, and attaching the pin support to a portion of the leader adjacent the front and along the underside of the bait.

* * * * *